United States Patent [19]

Saenger, Jr.

[11] 3,809,850
[45] May 7, 1974

[54] PLASMA ARC POWER SYSTEM FOR WELDING

[75] Inventor: John F. Saenger, Jr., Yorktown Heights, N.Y.

[73] Assignee: Union Carbide Corporation, New York, N.Y.

[22] Filed: May 17, 1972

[21] Appl. No.: 254,093

[52] U.S. Cl.............................. 219/121 P, 219/131 R
[51] Int. Cl................................................. B23k 9/00
[58] Field of Search ............ 219/121 P, 121 R, 131, 219/74, 75

[56] References Cited
UNITED STATES PATENTS

| | | |
|---|---|---|
| 3,354,289 | 11/1967 | Haase et al. ................... 219/131 R |
| 3,174,027 | 3/1965 | Manz ............................. 219/131 R |
| 3,586,817 | 1/1970 | Manz ................................. 219/131 |

*Primary Examiner*—J. V. Truhe
*Assistant Examiner*—G. R. Peterson
*Attorney, Agent, or Firm*—Eugene Lieberstein

[57] ABSTRACT

A plasma arc power supply system for work-in-circuit welding over an extended current range of between .1 amperes to at least 100 amperes wherein the main arc current control circuit includes a variable potentiometer independent from the pilot arc current control circuit such that the main arc current may be varied, particularly below 15 amperes, without affecting the pilot arc.

4 Claims, 5 Drawing Figures

PLASMA ARC POWER SYSTEM FOR WELDING

This invention relates to electric arc plasma welding and more particularly to an electric arc plasma welding system for welding over an extended current range.

Electric arc work-in-circuit systems in which the arc is constricted through the discharge outlet of a nozzle surrounding the electrode are generally referred to in the art as plasma arc systems. In such systems, a pilot arc is conventionally employed to help initiate and stabilize the main arc and more importantly to sustain the main arc at low current values.

It is desirable from an economy and efficiency viewpoint to provide both the pilot and main arc currents from a single power supply, preferably of the constant current type i.e., having a very steep volt-ampere characteristic. This is easily accomplished with systems operating above 15–20 amperes where the pilot arc is used primarily for main arc starting. These systems utilize a resistor connected between the nozzle and the work and the starting sequence involves initiating a pilot arc between the electrode and the nozzle with high frequency, then transferring the arc to the workpiece by means of the ionized gas developed by the pilot arc. Once the main arc is established, the pilot arc current drops to a lower level determined by the main arc voltage. Adjustments in main arc current or torch to work distance change the transferred arc voltage and hence the pilot arc current.

To facilitate an understanding of the prior art a more detailed description follows which should be read in connection with FIGS. 1–3 illustrating a conventional system of which:

Figure 1:
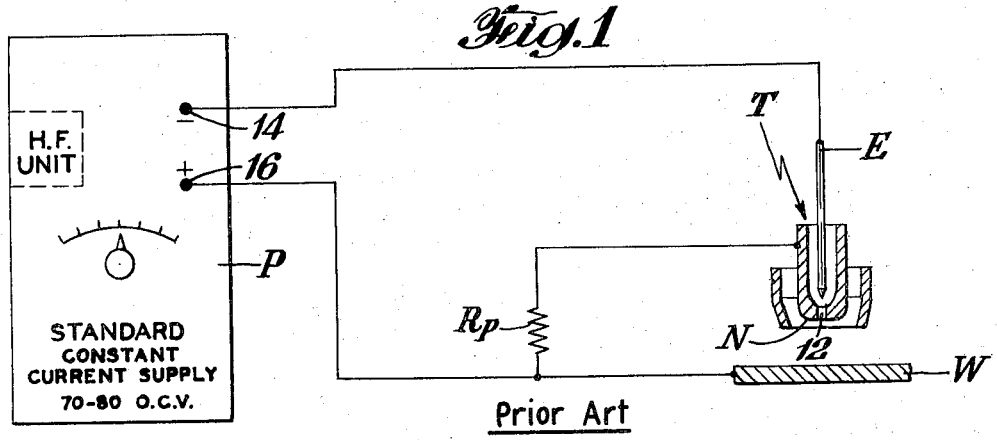
FIG. 1 is a schematic diagram of a conventional plasma arc welding system limited to high current operation.

The system shown in FIG. 1 comprises a standard constant current power supply having an open circuit voltage of about 70–80 volts DC. A standard constant current power supply is by definition one having a steep volt-ampere characteristic and basically includes a source of AC potential, a variable series impedance such as for example a saturable reactor and a rectifier network. Current is controlled by the variable series impedance. The power supply is also usually equipped with a conventional high frequency unit to assist in initiating the pilot and main arcs.

The plasma arc welding torch T includes a nonconsumable electrode E, usually of tungsten, coaxially disposed within a nozzle N having an arc constrictng discharge outlet 12 below the tip of the electrode E. The power supply P is connected with its negative output terminal 14 to the electrode E and with its positive output terminal 16 to a workpiece W. A resistor $R_p$ is connected between the nozzle N and the workpiece W.

With the power supply P and its high frequency unit on, orifice gas is passed down between the electrode E and nozzle N from whence it exits through output 12. A high frequency discharge path is immediately established between the electrode E and nozzle N initiating a pilot arc. The orifice gas is thus ionized enabling the main arc to strike between the electrode E and workpiece W. Resistor $R_p$, is selected to obtain a pilot arc current of between 5–15 amperes for reliable main arc starting.

The typical value of $R_p$ is 10 ohms. Thus, prior to main arc initiation, the pilot arc current will be:

$I_p$ = open circuit voltage - pilot arc voltage/$R_p$ or $80 - 8/10 = 7.2$ amperes. At this current level the volt-amphere characteristic of the power supply has a negligible effect.

Once the main arc transfers to the work, the voltage available for the pilot arc is reduced to the main arc voltage typically around 20 volts, and the pilot arc current thus drops to $20 - 8/10 = 1.2$ amperes.

Figure 2:
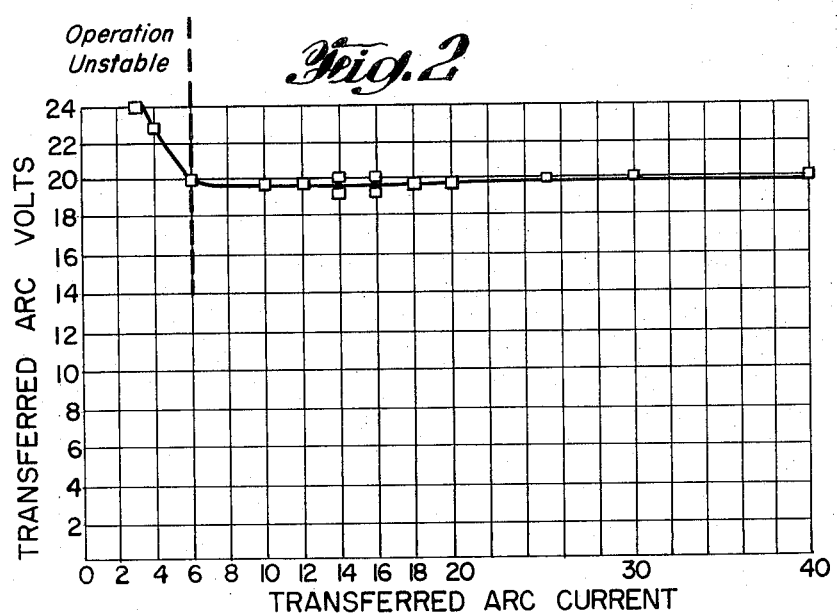
FIG. 2 is a plot of main arc voltage vs. current for the system shown in FIG. 1.

The transferred arc current remains stable until the main arc current is adjusted to below around 15 amperes. As shown in FIG. 2, the transferred arc voltage starts to rise sharply below a transferred arc current of 6 amperes and this is accompanied by instability and intermittant transfer. The reason for this instability is primarily due to the electrode not being heated sufficiently to maintain stable thermionic emission.

Figure 3:
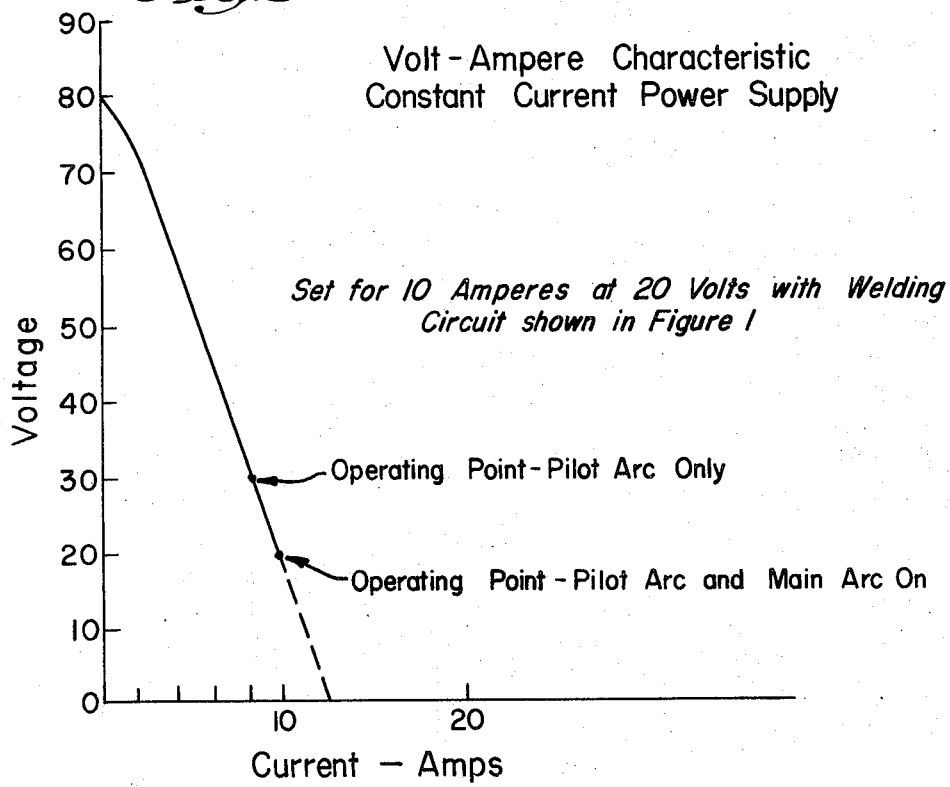
FIG. 3 is a volt ampere characteristic curve of the power supply of FIG. 1 adjusted to operate at 10 amperes.

Although it is theoretically possible to lower the value of $R_P$ to increase pilot arc current and stabilize the cathode, to do so would be impractical for two reasons. First with the pilot arc current adjusted to near the transferred arc current value, small changes in torch to work distance would cause unacceptable main arc current changes. Second, when the pilot arc current is adjusted to a relatively high valve and the setting of the power supply adjusted for a relatively low output current, only a small part of the open circuit voltage is available for striking and stabilizing the main arc. This result is apparent from FIG. 3 which shows the volt-ampere characteristic of the power supply adjusted for a pilot arc and transferred arc current operating at 5 amperes each. Equal current levels were brought about by reducing $R_P$ to be about 2.5 ohms. If the torch is now moved so that the transferred arc goes out, the pilot arc current will rise to about 8 amperes and the voltage between the electrode and the work to about 30 volts. This is the maximum voltage that would ever be available for stabilization and restriking at low power supply output current level settings; viz., below 15 amperes.

To avoid the problems outlined above and to provide full open circuit voltage for the transferred arc, present day low current plasma welding practice involves the use of the following two systems:

1. A special main arc power supply which will operate between 0.1 and 100 amperes and a 5–15 ampere pilot arc supply.

2. A low current main arc power supply operating from 0.1 to 15 amperes, a 5–15 ampere pilot arc supply, and a standard constant power supply for main arc currents above 15 amperes.

Such systems are complex, expensive and unwieldy.

It is therefore the principal object of the present invention to provide a plasma arc welding system which is compatible for use with a single conventional constant current welding power supply and which will provide main arc current control over an extended current range of between 0.1 to 100 amperes.

It is further object of the present invention to provide an adapter for a conventional constant current power supply to extend the operating range of the supply for plasma arc welding.

Figure 4:
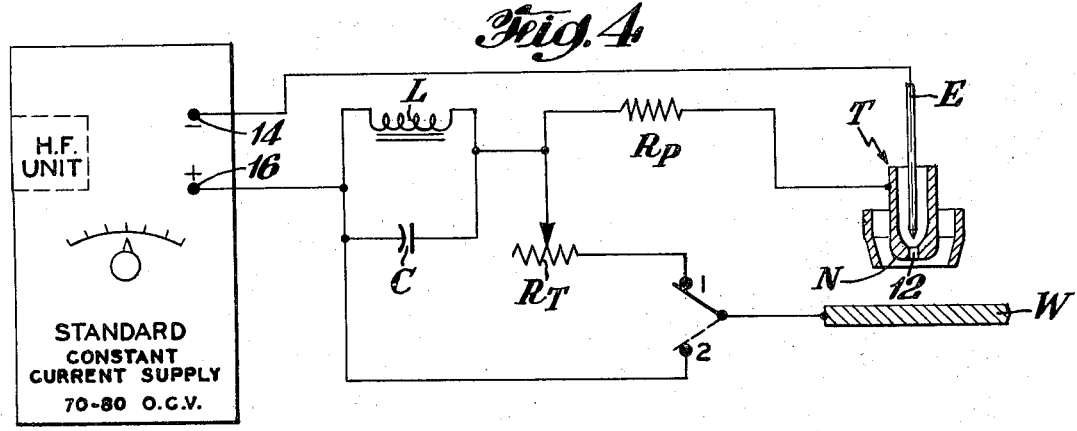
Figure 5:
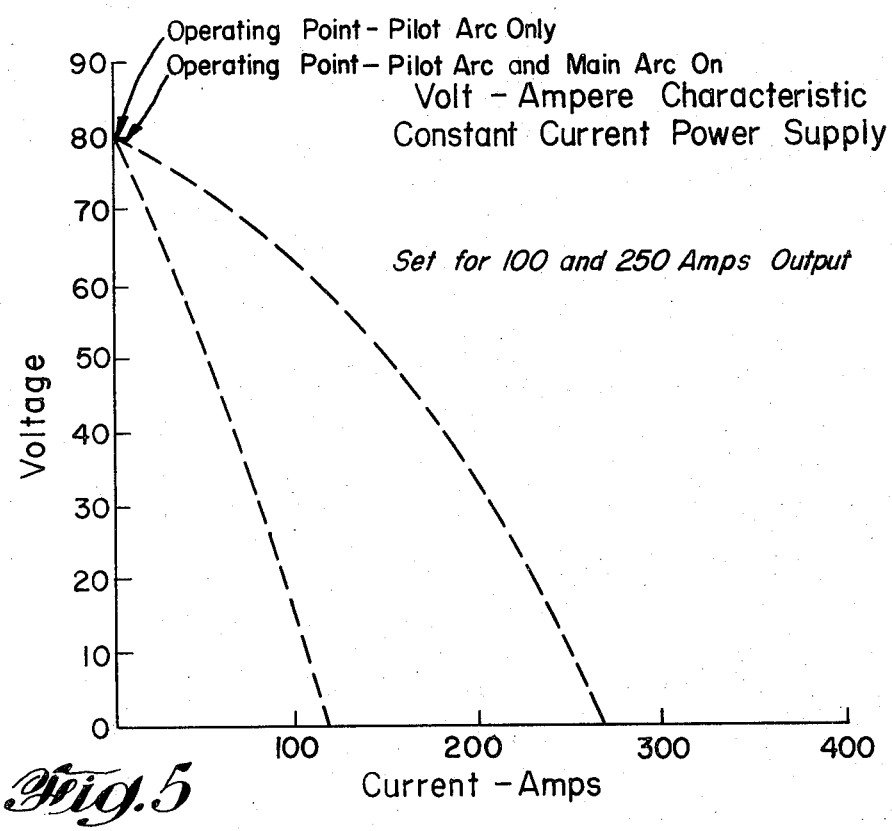

Advantages of the present invention will become apparent to those skilled in the art from the following detailed description of the invention taken in connection with the additional FIGS. 4 and 5 in which:

FIG. 4 is a schematic illustration of the plasma arc welding system of the present invention.

FIG. 5 is a representation of two volt-ampere output characteristics of a standard constant current power supply when connected in-circuit and adjusted for 100 and 250 amperes output current respectively.

In FIG. 4, torch T is identical to that shown in FIG. 1 and power supply P is likewise a standard constant current power supply having an open circuit voltage of around 70–80 volts DC. The negative terminal 14 of the power supply P is connected to the nonconsumable electrode E while the positive terminal 16 of power supply P is connected through resistor $R_p$ to nozzle N to form a pilot arc circuit in series with electrode E. In addition, the positive terminal 16 of power supply P is connected in circuit with the workpiece W through a switch S which in position 1 couples a variable rheostat $R_t$ in series therewith and in position 2 by-passes rheostat $R_t$ and directly connects the positive terminal 16 to the workpiece W. When switch S is in position 1, a main arc current circuit is formed between the workpiece W, variable rheostat $R_t$, the power supply P and electrode E. At low current operation, the function of the power supply P can be considered changed from constant current to constant potential. This is accomplished by merely setting the current control of power supply P to a relatively high output current setting of at least about 100 amperes. The pilot arc current is now determined substantially by the selection of resistor $R_p$ and the main arc current is determined substantially by the setting of the variable rheostat $R_t$. The pilot arc resistance, including residual resistance and $R_p$, should have a value of no less than 2 ohms and no greater than 40 ohms while $R_t$ should have a maximum of 600 ohms. The two arcs are now independent parallel loads on the power supply P. This is more readily understood in connection with FIG. 5, which shows a volt-ampere representation of the power supply P when set to operate at either about 100 or about 250 amperes respectively. It is easily seen that for each output current setting there is essentially no effect on the output voltage whether or not the main arc is on, i.e., it remains at an open circuit level of above 70 volts. The system of the present invention is, therefore, quite stable because the high open circuit voltage is always available. Main arc current control at high current operation may also be achieved through rheostat $R_t$ but at the expense of wasted power. For this reason, at high current operation, it is preferred to by-pass or short out rheostat $R_t$ by switching to position 2 and varying the current in the conventional manner.

An optional parallel circuit of an inductor L and capacitor C is shown in FIG. 4 to improve the arc characteristic for both high and low current operation. The preferred range for capacitor C is 0.1–6 micro-farads with 2 micro-farads being typical while the inductor L need be no greater than 12 milihenry.

What is claimed is:

1. A plasma arc welding system for work-in-circuit welding over an extended current range of between 0.1 amperes to at least 100 amperes from a single source of power having an output with an open circuit DC voltage in the range of between about 70 to 80 DC volts and a relatively steep volt-ampere characteristic, said system comprising:

a welding torch adapted to be held in close spacial relationship with the workpiece to be welded, said torch including a nonconsumable electrode disposed within a nozzle having an arc-constricting discharge passage;

a pilot arc current circuit including first resistor electrically connected in series circuit relationship with said nozzle, the output of said source of power and said nonconsumable electrode; and a main arc current and control circuit including second resistor electrically connected in series circuit relationship with said workpiece, the output of said source of power and said nonconsumable electrode, wherein the improvement comprises said second resistor being connected only in said main arc current circuit and being variable to control the main arc current substantially independently of said pilot arc current.

2. A plasma arc welding system as defined in claim 1 wherein said first resistor is a resistor having a magnitude between 2–40 ohms and wherein said second resistor is a variable resistor having has a maximum value of 600 ohms.

3. A plasma arc welding system as defined in claim 2 further comprising switch means electrically connected in said control circuit, said switch means having one position for disconnecting said variable resistor from said system and connecting one of the output terminals of said power supply to said workpiece and another position for series coupling said variable resistor to said workpiece.

4. In a plasma arc welding power supply, of the constant current type, comprising; means for generating a DC output having an open circuit voltage of between 70–80 volts for welding with a plasma arc torch having a non-consumable electrode disposed within a nozzle having an arc-constricting discharge passage; pilot arc circuit means including a first resistor adapted to complete a series circuit with said nozzle, said nonconsumable electrode and the power supply DC output; and a main arc circuit, wherein the improvement comprises: a variable resistor connected only in said main arc circuit and adapted for series connection to said workpiece such that the main arc circuit may be adjusted substantially independent of the pilot arc current.

* * * * *